United States Patent [19]

Schappler

[11] Patent Number: 4,992,810
[45] Date of Patent: Feb. 12, 1991

[54] COMPACT CAMERA WITH FLASH UNIT
[75] Inventor: Joseph J. Schappler, Rochester, N.Y.
[73] Assignee: Eastman Kodak Company, Rochester, N.Y.
[21] Appl. No.: 465,686
[22] Filed: Jan. 16, 1990
[51] Int. Cl.⁵ .............................................. G03B 15/05
[52] U.S. Cl. .............................................. 354/149.11
[58] Field of Search .................................. 354/149.11
[56] References Cited
U.S. PATENT DOCUMENTS
4,688,064  5/1987  Harvey .......................... 354/149.11

Primary Examiner—Michael L. Gellner
Attorney, Agent, or Firm—Roger A. Fields

[57] ABSTRACT

A compact camera comprising a camera housing, a pop-up electronic flash unit supported for movement between a storage position at least partly within the camera housing and a flash-emitting position elevated above the camera housing, and a film take-up drum rotatable within the camera housing to wind a filmstrip onto the drum, is characterized in that the take-up drum includes a central longitudinal cavity for receiving the flash unit when the flash unit is in its storage position. Since the flash unit can be stored within the take-up drum, a greater degree of compactness can be achieved as compared to prior art cameras.

6 Claims, 3 Drawing Sheets

COMPACT CAMERA WITH FLASH UNIT

BACKGROUND OF THE INVENTION

1. Field of the Invention

The invention relates generally to the field of photography, and particularly to a compact camera with a built-in pop-up electronic flash unit.

2. Description of the Prior Art

A current trend in camera design is to incorporate an electronic flash unit in the camera housing and yet make such housing relatively small in size in order to increase its ease of storage, portability, and handling. As a consequence of making a camera housing small in size and include a built-in flash unit, the separation between the taking lens and the flash unit is reduced, thereby possibly creating an undesired effect commonly known as "red-eye". When using a flash unit and color print film, red-eye is typified by the pupils in the eyes of a person being photographed coming out red-tinted on the resulting color print. Such phenomenon is attributable to the incidence into the taking lens of the red light reflected from the retinas in the person's eyes illuminated by the flash light.

Red-eye as is known may be substantially avoided by increasing the separation between the flash unit and the taking lens. As a result, light from the flash unit will reach the eyes of a person being photographed at two great an angle to be reflected by his retinas into the taking lens. Thus, in commonly assigned U.S. Pat. No. 4,557,571, issued Dec. 10, 1985, red-eye appears to be substantially avoided by providing a compact camera with an electronic flash unit that is pivotable with respect to the camera housing between a folded storage position in which it forms an integrated part of the camera housing in front of the taking lens and an operative erect position in which it is sufficiently removed from the lens to permit picture-taking substantially without the occurrence of red-eye. However, some degree of compactness is sacrificed. Other compact cameras, such as disclosed in commonly assigned U.S. Pat. No. 4,668,064, issued May 26, 1987, include a pop-up electronic flash unit supported for movement between a storage position partly within the camera housing and a flash-emitting position elevated above the camera housing. Here again, some degree of compactness is sacrificed.

SUMMARY OF THE INVENTION

According to the invention, there is provided a compact camera comprising (a) a camera housing, (b) a pop-up electronic flash unit supported for movement between a storage position at least partly within said camera housing and a flash-emitting position elevated above the camera housing, and (c) a film take-up drum or spool rotatable within said camera housing to wind a filmstrip onto said drum, characterized in that said take-up drum includes a central longitudinal cavity for receiving said flash unit when the flash unit is in its storage position.

Since the flash unit can be stored within the take-up drum, a greater degree of compactness can be achieved as compared to prior art cameras.

DETAILED DESCRIPTION OF THE PREFERRED EMBODIMENT

The invention is disclosed as being embodied preferably in a 35 mm compact camera having a built-in pop-up electronic flash unit. Because such a photographic camera and flash unit are well known, this description is directed in particular to camera elements and flash elements forming part of or cooperating directly with the disclosed embodiment. It is to be understood, however, that camera and flash elements not specifically shown or described may take various forms known to persons of ordinary skill in the art.

Figure 6:
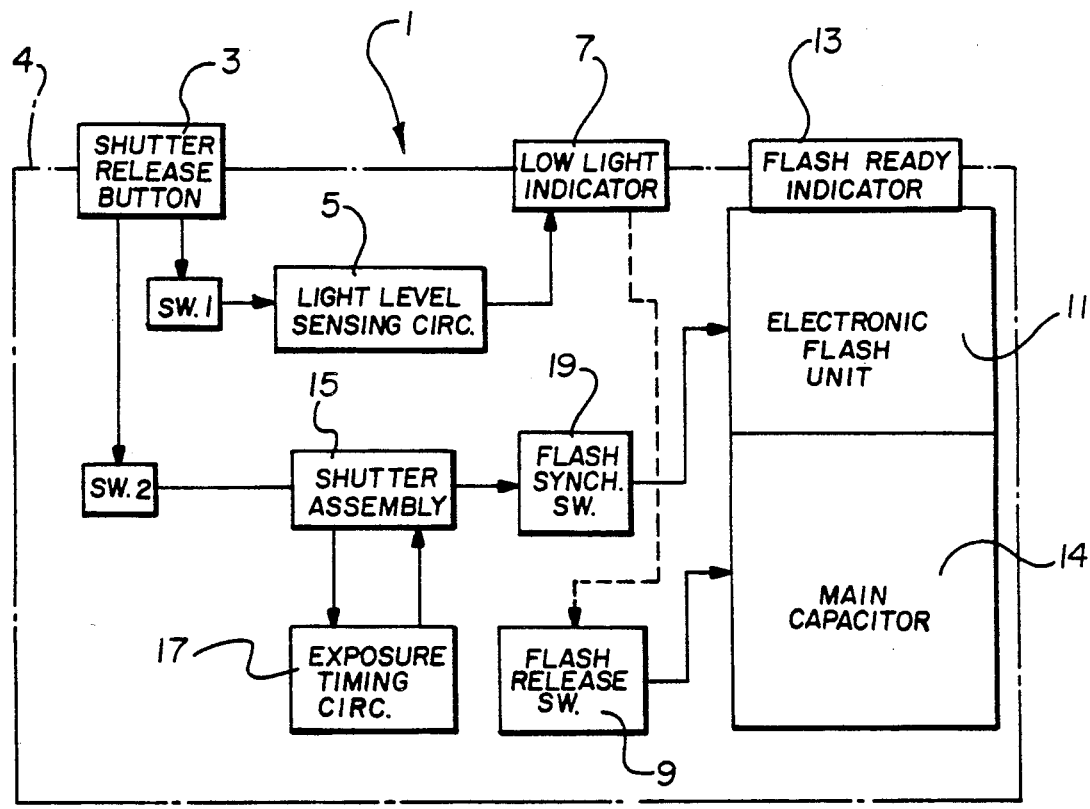
FIG. 6 is a schematic representation of typical flash exposure related functions in the compact camera.

Referring now to the drawings, FIG. 6 is a schematic representation of typical flash exposure related functions in a 35 mm compact camera 1 during a picture-taking cycle. When a shutter release button 3 atop the camera housing 4 is initially depressed by a user's finger pressure, a normally open switch SW. 1 is closed, thereby energizing a conventional light-level sensing circuit 5, such as the one disclosed in U.S. Pat. No. 4,160,588. If ambient light reflected from a subject to be photographed is too low for an acceptable exposure, the energized circuit 5 causes a low light indicator 7, e.g. a light-emitting diode, atop the camera housing 4 to alert the user that flash illumination of the subject is necessary. In this instance, the user would actuate a flash release latch 9 by moving a slide button or other known means, not shown, to release a pop-up (extensible) type electronic flash unit 11. A normally open switch, not shown, closes in response to movement of the flash unit 11 from a retracted storage position, shown in FIGS. 1 and 3, to an extended flash-emitting position, shown in FIGS. 2 and 4, to energize the flash unit. A flash ready indicator 13, e.g. a light-emitting diode, atop the flash unit 11 alerts the user that the flash unit is energized. While not shown in FIG. 6, except for a main flash capacitor 14, in a typical flash circuit for the flash unit 11, the main capacitor is connected across opposite end terminals of an electronic flash tube. The resistance of the gas in the flash tube is normally too high to permit a direct discharge. For firing the flash tube there is a third electrode, usually a coil of wire wound round the outside of the tube. An instantaneous triggering voltage applied to this electrode ionizes the gas in the flash tube, thus lowering its resistance and allowing the main capacitor 14 to discharge its energy through the tube in the form of a brilliant flash of light. The triggering voltage can be supplied by a small induction coil picked off a potentiometer across the main capacitor 14.

Continued depression of the shutter release button 3 after the flash ready indicator 13 has indicated that the flash unit 11 is energized closes a normally open switch SW.2. The closed switch SW.2 causes an electromagnetic latch, not shown, to be actuated, thereby permitting opening movement of a known dual blade shutter assembly 15, such as the one disclosed in U.S. Pat. No. 4,493,547. Opening movement of the shutter assembly 15, in turn, causes a conventional exposure timing circuit 17 to be energized. While not shown, the basic components of the exposure timing circuit 17 are typically a capacitor and a photoconductor. The photoconductor is disposed to receive ambient light reflected from the subject to be photographed and has a resistance that varies in inverse proportion to the intensity of such incident light. When the timing circuit 17 is energized in response to opening movement of the shutter assembly 15, the capacitor begins to charge at a rate inversely proportional to the product of its capacitance and the resistance of the photoconductor. Charging of the capacitor to a particular level actuates an electromagnetic latch, not shown, permitting the shutter assembly 15 to start its closing movement. If the light intensity falling on the photoconductor is high, the charging period of the capacitor—and hence the interval between shutter opening and shutter closing—is comparatively short. In low light, however, the resistance of the photoconductor increases and the capacitor takes longer to charge, which leads to a longer exposure time.

With opening movement of the shutter assembly 15, a flash synchronization switch 19 controlled by the shutter assembly triggers the electronic flash unit 11 to provide flash illumination of the subject being photographed. The electronic flash unit 11 as is typical has a very short duration light output on the order of a millisecond and reaches peak light intensity almost immediately. Therefore, the flash unit 11 is fired after the shutter assembly 15 is actuated to assure that the shutter assembly is opened before flash ignition.

When ambient light reflected from a subject to be photographed is sufficient for an acceptable exposure without flash illumination of the subject, initial depression of the shutter release button 3 to close the switch SW.1 does not cause energization of the low light indicator 7. In this instance, the user can immediately continue to depress the shutter release button 3 until the switch SW.2 is closed, thereby sequencing the compact camera 1 to take an exposure without firing the flash unit 11.

Figure 1:
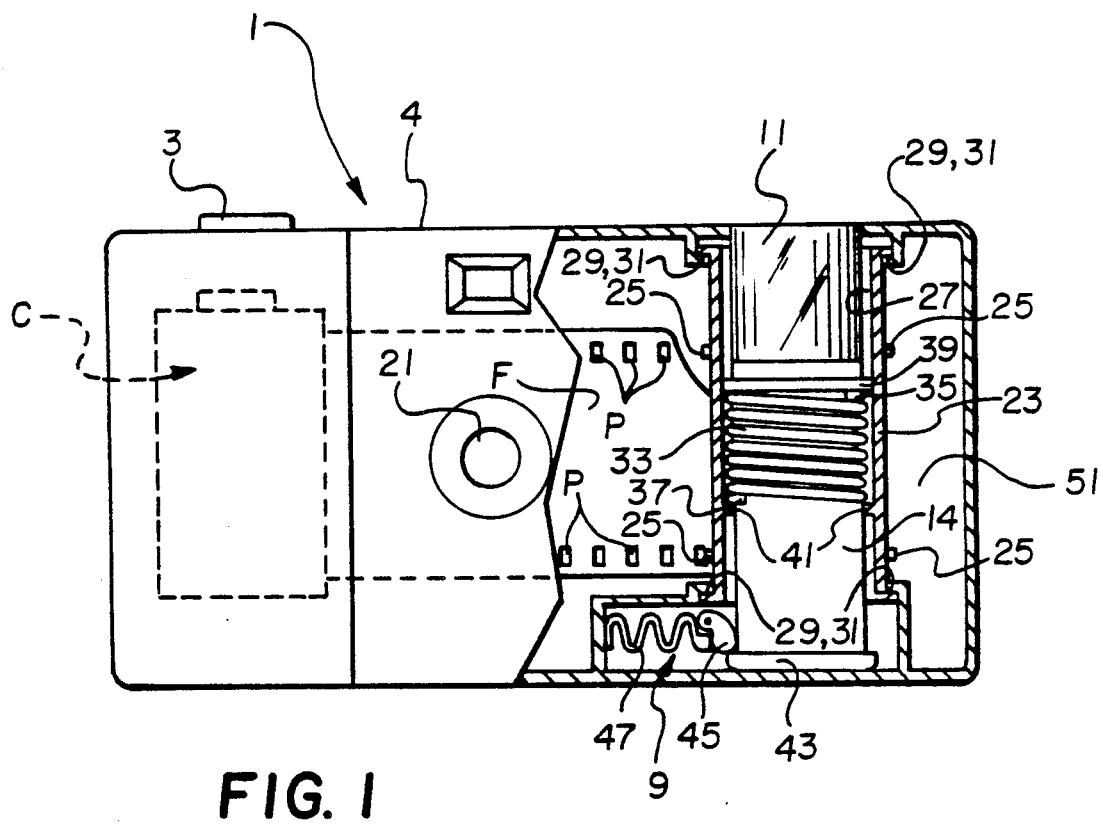
FIG. 1 is a front elevation view of a compact camera according to a preferred embodiment of the invention, showing a pop-up electronic flash unit stored within a film take-up drum in the interior of the camera housing.

As shown in FIG. 1, the camera housing 4 is adapted to receive a conventional 35 mm film cartridge C from which a filmstrip F is to be advanced across the focal plane of an objective lens 21 in order to expose successive imaging areas (frames) of the filmstrip. A film take-up drum 23 is rotatable within the camera housing 4 to wind the filmstrip F onto the drum. The take-up drum 23 has two spaced circular sets of peripheral teeth 25 for initially engaging the filmstrip F at its corresponding longitudinal rows of perforations P. In addition, the take-up drum 23 includes a central longitudinal cavity or opening 27 for the flash unit 11 and the main capacitor 14. The camera housing 4 and the take-up drum 23 include complementary means in the form of respective bearing surfaces 29 and 31 for mounting the drum to rotate about the flash unit and the main capacitor 14 in order to wind the filmstrip F onto the drum. See FIGS. 3 and 4. The take-up drum 23, the flash unit 11, and the main capacitor 14 are each cylindrical shaped to facilitate rotation of the drum about the flash unit and the capacitor.

Figure 3:
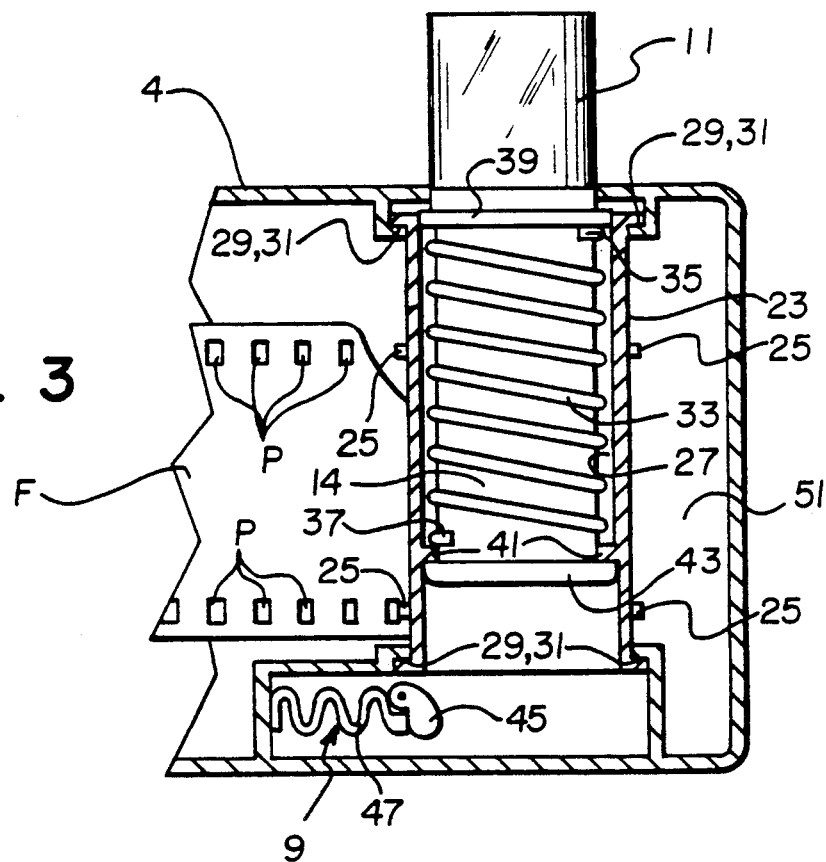
FIG. 3 is a front elevation view of the take-up drum and the flash unit, showing the flash unit in its storage position.
Figure 4:
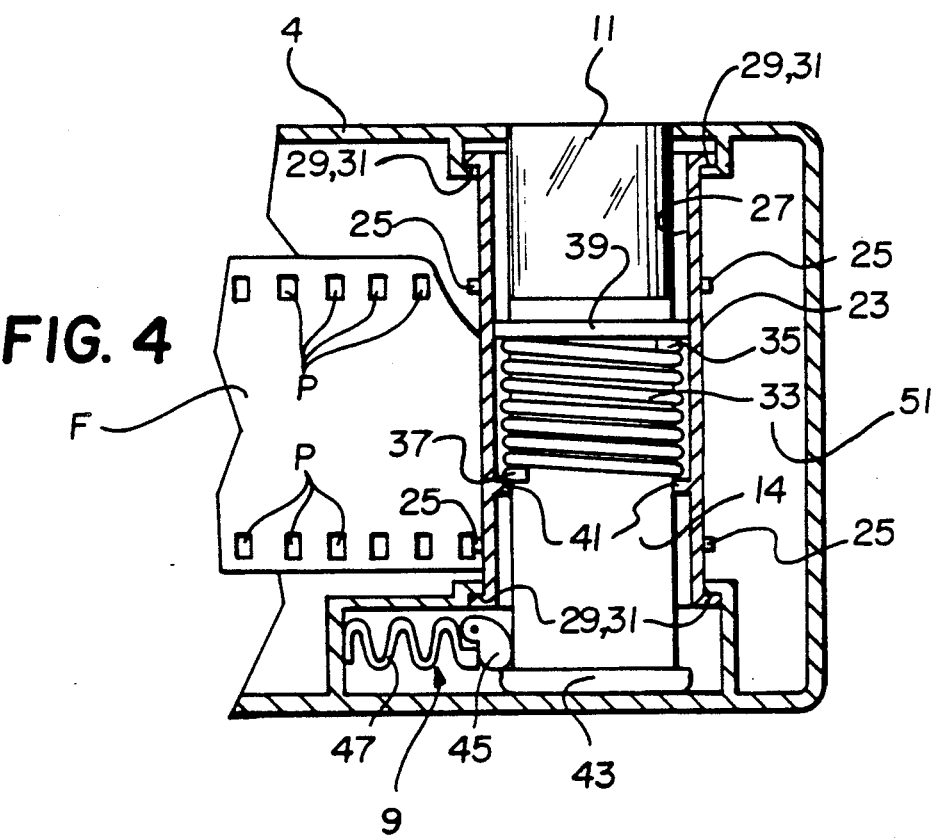
FIG. 4 is a front elevation view similar to FIG. 3, showing the flash unit in its popped-up position.

A helical compression spring 33 is located within the cavity 27 of the take-up drum 23 for urging the flash unit 11 to move from its storage position, shown in FIGS. 1 and 3, to its flash-emitting position, shown in FIG. 4. Since the main capacitor 14 is coupled to the flash unit 11, it will move with the flash unit. The spring 33 encircles the flash unit 11 and the main capacitor 14, and it includes respective opposite ends 35 and 37 which bear against an integral annular collar 39 of the flash unit and an integral concentric flange 41 of the take-up drum 23. The end 35 of the spring 33 is fixed to the collar 39 of the flash unit 11, but the end 37 of the flash unit is not fixed to the flange 41 of the drum 23. This permits the drum 23 to rotate about the flash unit 11 and the main capacitor 14. The capacitor 14 includes a lower annular lip 43 which abuts against the flange 41 of the drum 23 when the flash unit 11 is in its flash-emitting position. See FIG. 4. This interaction between the lip 43 of the capacitor 14 and the flange 41 of the drum 23 limits the extent to which the spring 33 can elevate the flash unit 11 to its flash-emitting position.

Figure 5:
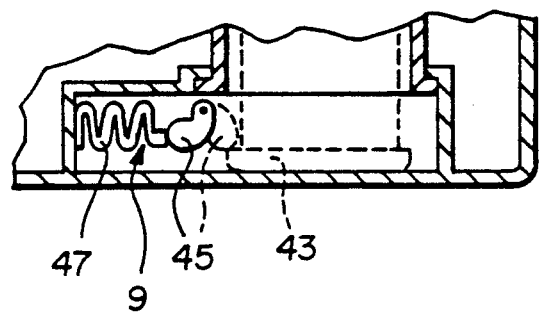
FIG. 5 is a front elevation view of a latch for releasably securing the flash unit in its storage position.

The flash release latch 9 for securing the flash unit 11 in its storage position includes a pivotally mounted latching member 45 which is urged by a helical compression spring 47 to engage the lower lip 43 of the main capacitor 14, thereby to hold the flash unit in the storage position. See FIG. 3. When the latching member 45 is pivoted out of engagement with the lip 43 by manually moving a slide button or other known means, not shown, the spring 33 is free to move the flash unit 11 to its flash-emitting position. See FIG. 4. To return the flash unit 11 to its storage position, the user manually pushes down on the flash unit to push it into the cavity 27 of the drum 23. The latching member 45 as shown in FIG. 5 will be cammed out of the way of the lower lip 43 of the capacitor 14 to allow the lip to bypass the latching member. Then, the spring 47 will urge the latching member 45 to re-engage the lip 43. See FIG. 3.

Figure 2:
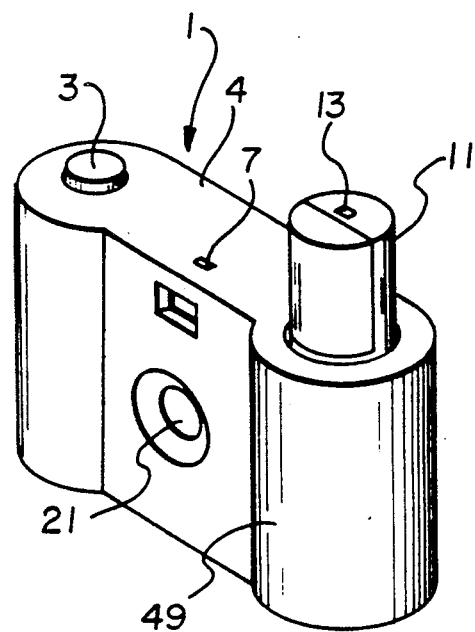
FIG. 2 is a front perspective view of the compact camera, showing the flash unit popped up from the camera housing.

The camera housing 4 as shown in FIGS. 1 and 2 includes a front-to-rear exterior wall portion 49 which curved to partly surround the take-up drum 23 in spaced relation. This results in the formation of a film take-up chamber 51 between the wall portion 49 and the drum 23.

The invention has been described with reference to a preferred embodiment. However, it will be appreciated that variations and modifications can be effected within the ordinary skill in the art without departing from the scope of the invention. For example, instead of the take-up drum 23 a take-up spool may be used.

I claim:

1. A compact camera comprising (a) a camera housing, (b) a pop-up electronic flash unit supported for movement between a storage position at least partly within said camera housing and a flash-emitting position elevated above the camera housing, and (c) a film take-up drum rotatable within said camera housing to wind a filmstrip onto said drum, characterized in that said take-up drum includes a central longitudinal cavity for receiving said flash unit when the flash unit is in its storage position.

2. A compact camera as recited in claim 1, wherein said camera housing and said take-up drum include complementary means mounting the drum for rotation about said flash unit when the flash unit is in its storage position.

3. A compact camera as recited in claim 2, wherein said take-up drum and said flash unit are each substantially cylindrically shaped to facilitate rotation of the drum about the flash unit.

4. A compact camera as recited in claim 3, further comprising helical compression spring means located within said cavity of the take-up drum for urging said flash unit to move from its storage position to its flash-emitting position, said spring means encircling the flash unit.

5. A compact camera as recited in claim 4, wherein said spring means is connected to said flash unit and is movable relative to said take-up drum to permit the drum to rotate about the spring means when the drum is rotated about the flash unit.

6. A compact camera as recited in claim 3, wherein said camera housing includes a front-to-rear exterior wall portion which is curved to partly surround said take-up drum in spaced relation to form a film take-up chamber between said wall portion and the drum.

* * * * *